Oct. 21, 1930.   R. E. B. SHARP   1,779,191
HYDRAULIC APPARATUS
Filed Dec. 31, 1927   4 Sheets-Sheet 1
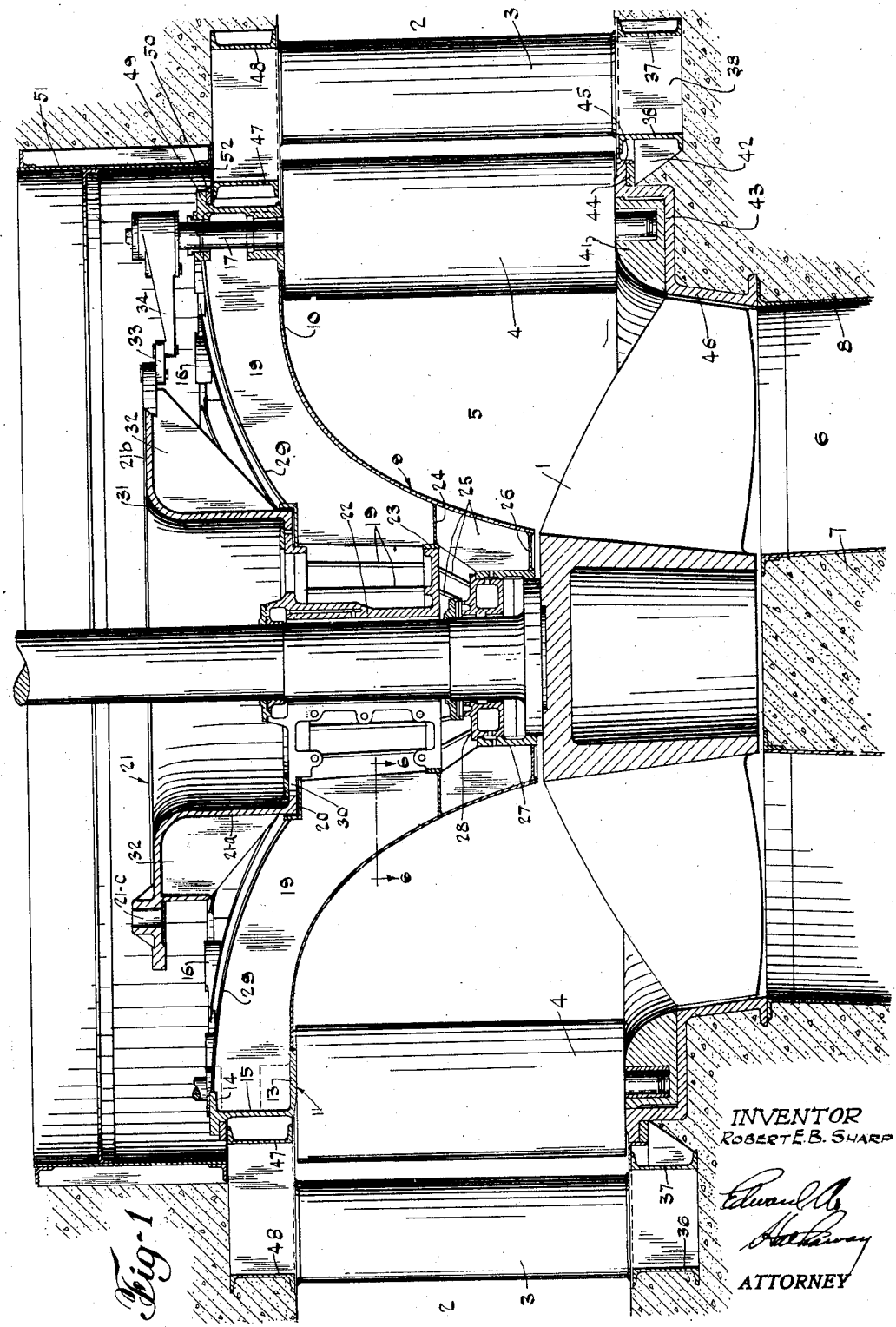
INVENTOR
Robert E. B. Sharp
ATTORNEY Oct. 21, 1930.    R. E. B. SHARP    1,779,191
HYDRAULIC APPARATUS
Filed Dec. 31, 1927    4 Sheets-Sheet 2
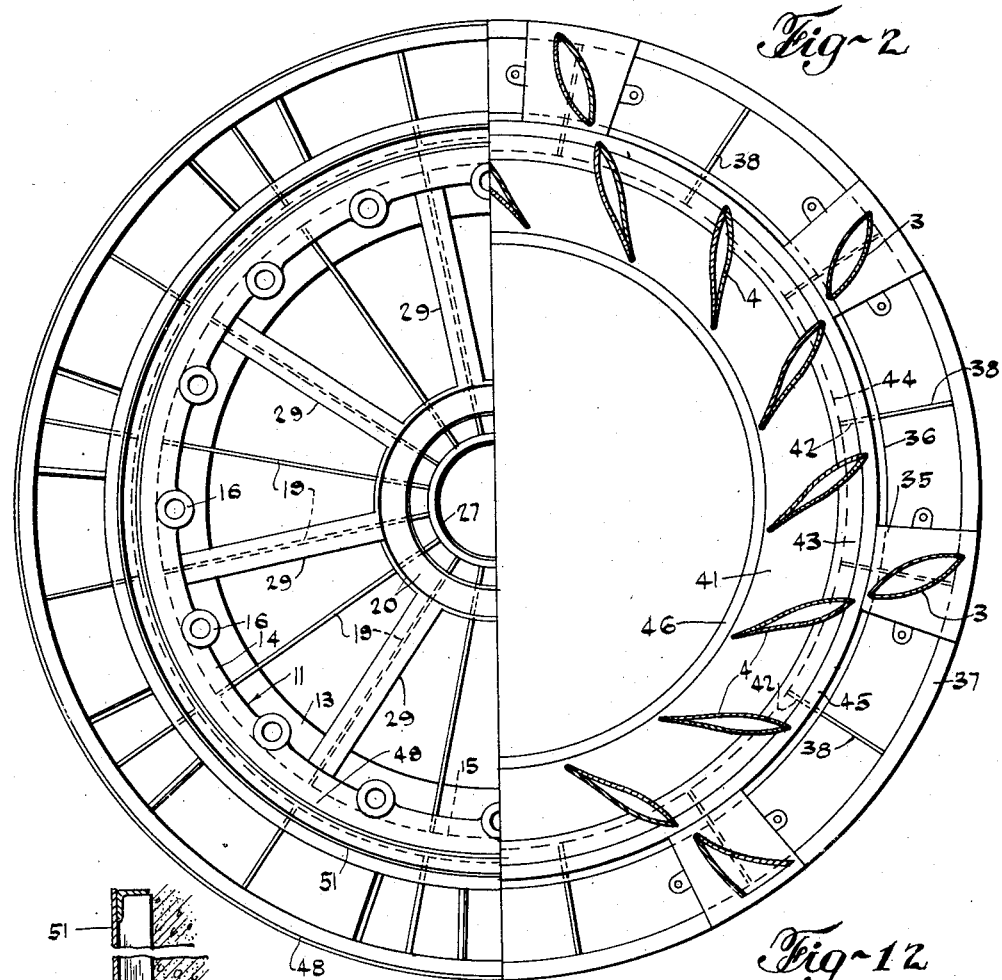
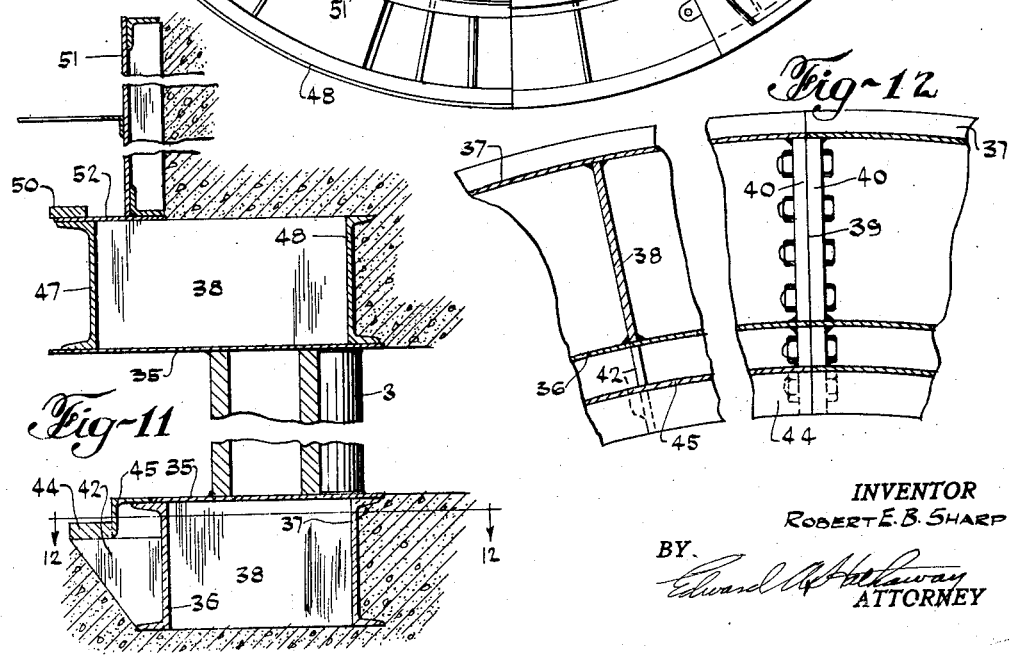
INVENTOR
Robert E. B. Sharp
BY
Edward A. Hathaway
ATTORNEY Oct. 21, 1930.  R. E. B. SHARP  1,779,191
HYDRAULIC APPARATUS
Filed Dec. 31, 1927   4 Sheets-Sheet 3
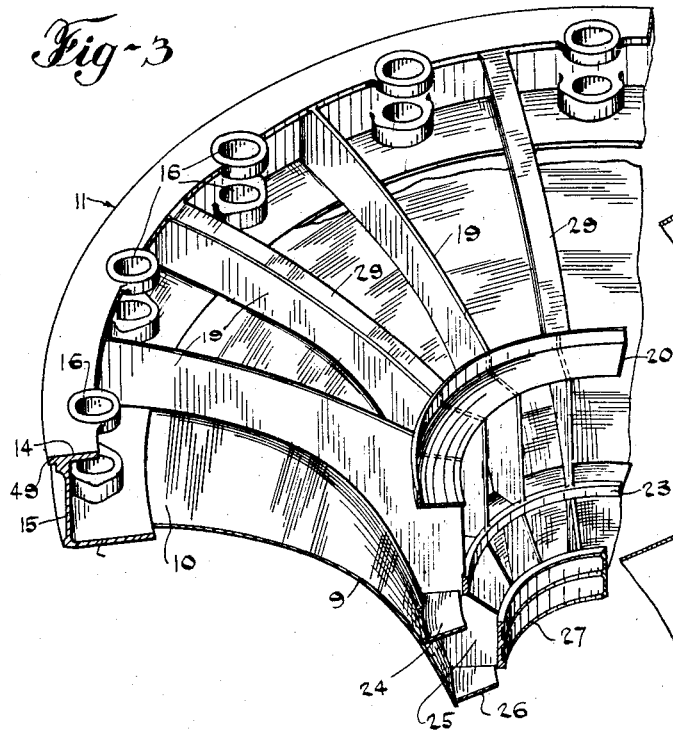
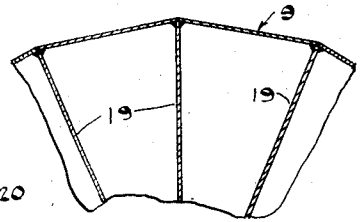
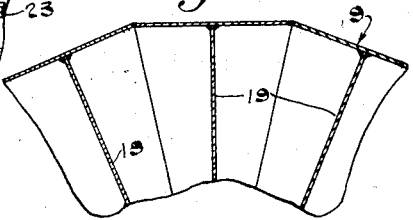
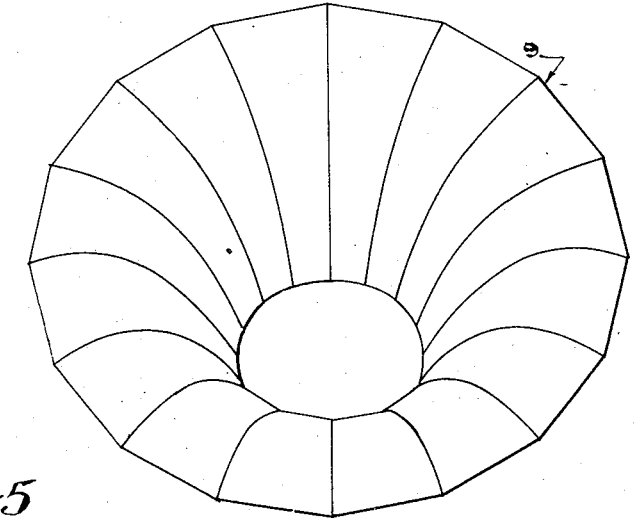
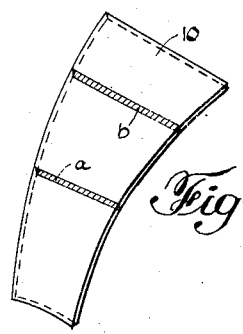
INVENTOR
ROBERT E.B. SHARP
BY
ATTORNEY Oct. 21, 1930.  R. E. B. SHARP  1,779,191
HYDRAULIC APPARATUS
Filed Dec. 31, 1927  4 Sheets-Sheet 4
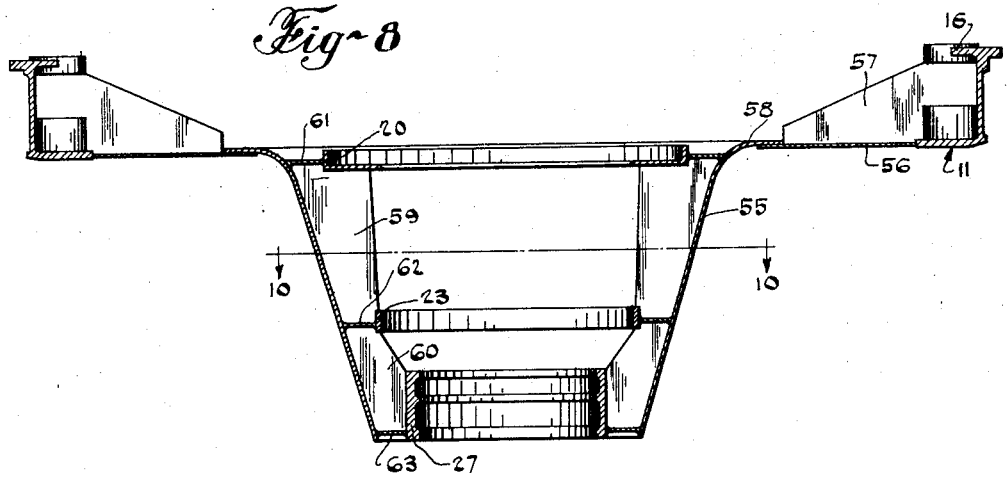
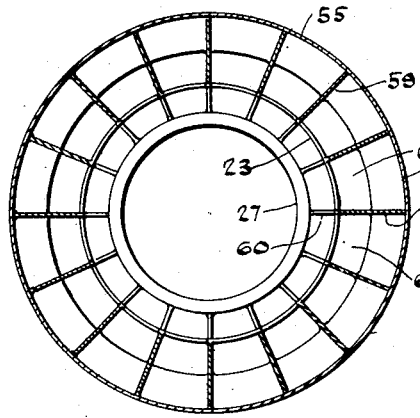
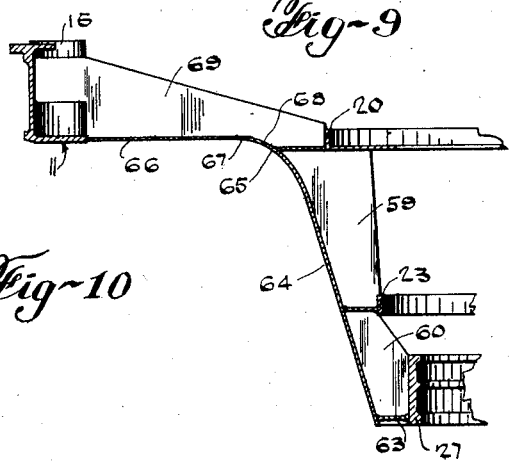
INVENTOR
ROBERT E. B. SHARP
BY
ATTORNEY Patented Oct. 21, 1930

1,779,191

UNITED STATES PATENT OFFICE

ROBERT EDWARD BRUNSWICK SHARP, OF PHILADELPHIA, PENNSYLVANIA, ASSIGNOR TO I. P. MORRIS CORPORATION, A CORPORATION OF DELAWARE

HYDRAULIC APPARATUS

Application filed December 31, 1927. Serial No. 243,826.

This invention relates generally to hydraulic turbines and more particularly to a composite or fabricated head cover and speed ring. One object of the invention is to provide an improved head cover which not only is relatively simple in construction but is inexpensive, rugged and readily adapted to have its component parts secured together by welding. A further object is to obtain these features by so arranging and constructing the elements as to permit use of structural steel including plate steel and usual structural shapes or in some instances to use the plate steel in combination with cast members. Further objects are to provide improved means for supporting the steady bearing for the runner shaft and to provide an improved composite speed ring.

Further objects and advantages will be seen from the following description of the accompanying drawings in which:

Fig. 1 is a vertical sectional view, parts of which have been omitted and other parts shown in elevation, for clearness.

Fig. 2 is a partial plan view of the head cover with the gate-operating mechanism omitted, a half section being taken to show the speed ring and guide vanes.

Fig. 3 is a perspective of a quarter-section of the head cover.

Fig. 4 is a perspective looking down upon one form of the head cover crown or cone.

Fig. 5 is a perspective of a single section or panel forming the cone in Fig. 4.

Fig. 6 is a fragmentary section taken at a position indicated by the line 6—6 in Fig. 1.

Fig. 7 is a modification of a section similar to Fig. 6.

Figs. 8 and 9 are sectional views of modified forms of head cover.

Fig. 10 is a section on line 10—10 of Fig. 8.

Fig. 11 is an enlarged sectional view of the speed ring construction.

Fig. 12 is a horizontal section taken on line 12—12 of Fig. 11.

In the illustrated embodiment of my invention I have shown the same in connection with a high specific speed propeller type runner, but it will of course be understood that the invention may be applicable to any type of turbine, for example, one containing a Francis runner, wherein a head cover, built according to the principles herein disclosed, may be used. The runner 1 receives its flow through a radial inlet 2 containing stay vanes 3 and adjustable guide vanes or wicket gates 4 there being a transition space 5 in which the flow is turned to an axial direction and passed through the runner to be discharged into a suitable draft tube 6 herein shown as having a core 7 and outer plate steel wall 8.

As is usual in turbine construction, the head cover forms the upper and inner surfaces of the intake passage and transition space. Constructions heretofore employed are of such a nature as to render the head cover a very expensive part of the turbine construction, it being one of the objects of my invention to simplify the head cover and reduce its cost. To this end I propose using a plate steel crown 9, preferably having one portion or section thereof in the form of a cone, which as shown in Fig. 1 flares outwardly to merge with a horizontal part 10 acting as a continuation of what is herein called for clarity and simplicity the upper distributor ring 11. The distributor ring is a casting somewhat in the form of a channel and having upper and lower legs 13 and 14 connected by a web 15, while a series of bearings 16 are provided for journaling the stems 17 of guide vanes 4. The ring is preferably cast in order that the bearings and other features may be easily formed, although it will of course be understood that the distributor ring could be built up of plate members and suitable bearing housings welded thereto, or, if desired, the members 13, 15 could constitute an angle iron and the leg 14 a flat plate circularly curved, all of which could be suitably welded together. However, it is preferred to cast this distributor ring while the remaining parts of the head cover are so formed and constructed that they may be easily and yet durably and rigidly made of plate or structural steel. To this end the crown 9 as shown in Fig. 4 is built up of a series of plate sections one of which is shown in Fig. 5, these sections being curved outwardly so as to provide the necessary substantially conical configuration although they are straight in transverse section as at *a* and *b*, Fig. 5.

The lowermost portion of each section however may be slightly curved in order to conform to the circular contour of the runner hub. Due to making the crown in a number of sections and welding the same along their adjacent edges, a substantially uniform conical surface will be obtained.

To support the crown most rigidly with respect to the upper distributor ring there is provided a series of radial plate steel ribs 19 equally angularly spaced apart and having their outer ends supported by and between legs 13 and 14 of distributor ring 11, the inner ends of the ribs having their upper inner corners cut back to receive an angle iron 20 curved in plan view and which serves as a combined support for an operating ring 21 and a steady bearing 22. Secured to an intermediate part of the inner ends of the ribs is a piece of circular plate metal 23 which engages the lower end of the steady bearing 22. Disposed in a horizontal plane along the lower edge of each of the ribs 19 is a single annular member 24 while extending downwardly therefrom are further ribs 25. These in turn also have either arcuate plate metal spacing members 26 disposed therebetween or an annulus covering the entire lower edges of ribs 25. If desired ribs 19 and 25 may constitute one piece with arcuate spacing plates substituted for annular member 24. The inner edges of ribs 25 have a circular plate member 27 welded thereto for supporting a gland ring 28. Member 27 is preferably formed of plate material bent in circular form and provided with grooves on the inner side thereof. If desired both the upper and lower ribs 19 and 25 may be formed of one piece. To add further strength to the ribs 19 every other one has welded to its upper edge a piece of plate metal 29 thus forming a flange for the particular ribs.

All of the plate-metal members so far described and the cast distributing ring are welded together along their contacting edges so as to provide a unitary structure, and due to the construction and arrangement of the various elements a very strong and yet inexpensive plate steel cover is provided and one which lends itself very readily to welding of its component parts instead of riveting which entails complications in structure.

The steady bearing 22 is mounted in the angle support 20 by an overhanging flange 30 while the shifting or operating ring 21 is rotatably supported by the remaining portion of the angle iron 20. This operating ring can either be cast or made of two pieces of plate metal, one of which is a circular plate tubular member $21^a$ and the other an annulus $21^b$ of flat plate material, both of which are welded about midway of the bend 31. Suitable ribs 32 may be employed to increase the strength of the horizontal portion or annulus, and usual connecting links 33 and 34 may be employed to actuate adjustable vanes 4, suitable openings being provided to receive studs upon which links 33 are journaled while a bearing $21^c$ can be welded to annulus $21^b$ for receiving a connecting link from the usual type of gate operating servo-motor.

The stay vane or speed ring which supports the crown comprises a pair of channel irons 36 and 37 bent in a circular form as indicated in Fig. 2, and carrying small plates 35 upon which stay vanes 3 are supported and welded. Suitable ribs 38 may be used to hold plate metal channel irons 36 and 37 in spaced relation and also to permit the channel irons to be made in sections. The same may be split as indicated in 39, Fig. 12, and the adjacent edges held together by bolting or riveting together cross ribs 40 each welded to the channels of the respective sections. To support a lower removable wearing plate 41 which carries suitable bearings for supporting the lower ends of guide vanes 4 several small ribs 42 are circumferentially spaced about the speed ring construction and welded to the innermost channel iron 36 so as to project inwardly a sufficient distance to support the lower supporting ring 43, there being preferably a flat annular member 44 interposed between the lower supporting ring 43 and the ribs 42 which annular member is preferably welded to the ribs. A small circular angle iron 45 is also welded to the upper leg of the channel 36 and the member 44, thereby providing a suitable lateral support for the lower supporting ring 43. This lower supporting ring continues downwardly to form a wall 46 which immediately surrounds and is adjacent to the periphery of the runner blades. The stay vanes 3 in addition to being welded and mounted upon the plates 35 are similarly attached to upper channel members 47 and 48 this upper construction being similar to the lower one although somewhat wider so as to permit a flange 49 of the upper distributor ring to be supported on the inner channel member 47 through an interposed annular ring 50.

To provide a suitable housing for the gate operating mechanism, including operating ring 21, a circular plate metal member 51 rests upon the upper speed ring construction, which also includes an annular plate 52 extending outwardly from the channel iron 47.

The channel-iron construction, stay vanes and their associated plate metal parts all will be preferably welded together to form a unit, thereby leaving only the steady bearings to be supported and the upper and lower distributing rings to be placed in operative relation to the speed-ring construction by means preferably other than welding.

It is thus seen that I have provided an extremely simple and highly efficient type of head cover and stay vane ring, due to the arrangement and construction of the component parts. The speed ring construction, after being positioned is grouted in so that smooth horizontal surfaces are provided over the spaces between the upper and lower channel irons.

A modified form of the head cover in general and particularly the crown 9 is shown in Fig. 8 as comprising a cone 55 formed preferably of a single piece of plate metal bent in a conical form and having its adjacent edges welded, thereby making the cone have a substantially true circular cross section, as shown in Fig. 10. To support the cone and also to provide the upper distributor ring, a flat annular plate 56 is welded to the cast distributor ring 11. Short ribs 57 extend inwardly and are welded to plate 56 and ring 11, the upper end of the cone 55 being flanged or turned outwardly as indicated at 58 and supported by and welded to the plate 56. The remaining construction for supporting the steady bearing is similar to that shown in the preferred form in that flanges or ribs 59 and 60 are held in spaced relation by annular spacing plates 61, 62 and 63, all of which construction supports the angle iron 20, guide ring 23 and lower bearing support 27 in a manner similar to that shown in the preferred form. For simplicity this Fig. 8 does not include the remaining turbine construction or the remaining distributor-plate construction, all of which, however, will be of the same general nature as that shown in the preferred form.

In the form shown in Fig. 9 the crown 64 is formed also preferably by a single piece of metal welded at its adjacent abutting edges, and the upper end thereof is only partially flanged, so that it terminates at the point 65. A horizontal plate 66 instead of being an entirely flat plate as in the form shown in Fig. 8, has its inner circular edge portion slightly bent downwardly as at 67, thereby forming a smooth, curved surface when the portions 65 and 67 are brought together in abutting relation and welded as at 68. The ribs 69 are here shown as extending entirely out to the angle support 20 instead of terminating short thereof, as is the case in Fig. 8. The remaining construction, however, such as the ribs for supporting the steady bearing supports 23 and 27 is the same as in Fig. 8, it being noted that in the forms of Figs. 8 and 9 the edges of the ribs are cut along substantially straight lines thereby providing a very cheap construction. Or in other words the ribs are secured to the cone portion of the crown along lines which, as shown in Figs. 8 and 9, are straight throughout substantially, if not completely, their whole length while in the Fig. 1 form there are also appreciable distances of substantially straight portions. It is also to be noted that in the formation of the cones in any of the forms, the principle is employed of forming the surface with straight line elements. In the form shown in Fig. 3, and particularly as in Fig. 5 the straight line elements are in a transverse direction while in the forms shown in Figs. 8 and 9 the straight line elements extend in a substantially axial direction and for substantially the full length of the plate forming the cone portion or section. Thus in any form shown it is possible to produce the cone portion of the crown simply by rolling the same and thus avoiding complex curvatures, this being particularly true of the form shown in Figs. 8 and 9 wherein the straight line elements of the cone lie in substantially meridian planes, that is, planes containing the central axis of the turbine construction.

In the form shown in Figs. 3 and 4, the sectional cone may be so disposed with respect to the ribs 19 that the adjacent edges of the welded cone sections will fall in alignment with ribs 19 this form being shown in Fig. 6, or as shown in Fig. 7, the cone may be disposed so that the adjacent edges of the cone sections will fall intermediate adjacent ribs.

In any of the forms employed, however, or with any other modifications thereof built according to the principles outlined herein, it is clear that all of the advantages of the relatively expensive cast head covers are retained, while at the same time the further advantages of a far less expensive construction and one which can be built more easily and more quickly than the cast form are also had.

While the foregoing describes certain forms of my invention, it is obvious that other modifications may be employed without departing from the spirit of my invention, as set forth in the appended claims and that the invention may be used when desirable with any usual hydraulic machine of the type having a rotor disposed in a fluid passage which is formed by the head cover.

I claim:

1. A composite head cover for hydraulic machines comprising a distributing ring and a plate metal crown having a depending substantially conical portion, and means fabricated with said conical portion to provide a bearing support.

2. A composite head cover for hydraulic machines comprising an upper distributor ring, and a plate metal crown supported by said ring and provided with radial plate metal supporting ribs.

3. A composite head cover for hydraulic machines comprising an upper distributor ring, and a plate metal crown of substantially conical form flaring outwardly at its upper portion into horizontal alignment with said distributor ring.

4. A composite head cover for hydraulic turbines comprising an upper distributor ring, and a plate metal crown of substantially conical form flaring outwardly at its upper portion into horizontal alignment with said distributor ring, said ring and crown being welded together and plate metal radially extending ribs secured to the inner surface of said crown along lines which have a substantial straight portion.

5. A composite head cover for hydraulic turbines comprising a distributor ring, and a plate metal crown adapted to form the inner wall of a passage leading to the turbine runner, and having an annular plate metal member extending in a direction transversely of and at a point substantially adjacent the lower end of said wall.

6. A composite head cover for hydraulic turbines comprising a distributor ring, a plate metal crown of substantially conical form supported by the inner edge of said ring, and radially extending ribs attached to said ring and crown and terminating at their inner end at a point spaced away from the central axis of said ring, thereby to form a space through which a turbine shaft is adapted to pass.

7. A composite head cover for hydraulic turbines comprising a distributor ring, a plate metal crown supported thereby and secured thereto, and means adapted to support a bearing comprising radially extending ribs carried by said crown and spaced from the axis thereof, and elements secured to the inner ends of said ribs for supporting the bearing.

8. A composite head cover for hydraulic turbines comprising a plate metal crown of substantially conical form and having its upper portions flared outwardly to form a horizontal portion of an intake turbine passage, means for supporting said horizontal portion, radially extending plate metal ribs welded to said crown, a circular angle iron welded to said ribs, and a plate metal band also welded to said ribs for supporting a bearing.

9. A composite head cover for hydraulic turbines comprising a plate metal crown having a series of upwardly extending plate metal ribs, the inner edges of which are spaced away from the axis of said crown to form a space through which the turbine shaft may pass, the lower portion of said radial ribs extending upwardly from substantially the lowermost portion of said crown and extending inwardly a greater distance toward said axis than the upper portion of said ribs.

10. A composite head cover for hydraulic turbines comprising a plate metal crown having a series of upwardly extending plate metal ribs, the inner edges of which are spaced away from the axis of said crown to form a space through which the turbine shaft may pass, said radial ribs extending upwardly from substantially the lowermost portion of said crown and the lower portion of said ribs extending inwardly a greater distance toward said axis than the upper portion of said ribs, and horizontal arcuate plate metal members welded to said ribs to maintain the same in spaced relation.

11. A composite head cover for hydraulic turbines comprising a plate metal crown having a series of upwardly extending plate metal ribs, the inner edges of which are spaced away from the axis of said crown to form a space through which the turbine shaft may pass, said radial ribs extending from substantially the lowermost portion of said crown and the lower portion of said ribs extending inwardly a greater distance toward said axis than the upper portion of said ribs, horizontal arcuate plate metal members welded to said ribs to maintain the same in spaced relation, and a circular plate-metal band welded to the inner edges of said ribs at a point adjacent to the lower portion of said radial ribs.

12. A composite head cover for hydraulic turbines comprising a distributing ring, a plate-metal crown of substantially circular and conical contour, radial plate metal ribs extending from the lowermost portion of said crown up to said distributing ring, the inner portion of said ribs terminating at points spaced from the axis of the crown to provide a space through which the turbine shaft passes, and the lower portions of said ribs extending inwardly beyond the upper portion thereof, a plate-metal member welded to said ribs at a point adjacent their upper inner extremities, a plate-metal band welded to said ribs substantially adjacent the lower portion of the inwardly-extending ribs, and a plate metal band welded to the inwardly extended ends of the lower portion of said ribs, thereby providing suitable combined rib and steady-bearing supports.

13. A composite head cover for hydraulic turbines comprising a distributing ring, a plate-metal crown of substantially circular and conical contour, radial plate metal ribs extending from the lowermost portion of said crown up to said distributing ring, said ribs terminating at a point spaced from the axis of the crown to provide a space through which the turbine shaft passes, and the lower portion of said ribs extending inwardly beyond the upper portion thereof, a plate-metal member welded to said ribs at a point adjacent their upper inner extremities, a plate-metal band welded to said ribs substantially adjacent the inwardly-extending portion of said ribs, and a band welded to the inwardly extended ends of the lower portion of said ribs, thereby providing suitable combined rib and steady-bearing supports, and arcuate horizontally disposed plate metal webs disposed between successive ribs to hold the same in their angularly disposed relation.

14. In combination in a hydraulic turbine comprising a head cover provided with a bearing support, and an operating ring journaled therein comprising an axially extending substantially cylindrical plate metal section and a radial plate metal flange disposed at the upper end thereof, and means for operatively connecting said ring to the guide vanes of the turbine.

15. The combination in a hydraulic turbine comprising a head cover provided with a bearing support, and an operating ring journaled therein comprising an axially extending substantially cylindrical element having at its upper end a radial plate metal flange, means for operatively connecting said ring to the guide vanes of the turbine, and radial plate metal ribs extending between the lower side of said horizontal portion and the outer surface of said cylindrical portion for fabrication therewith.

16. The combination in a hydraulic turbine comprising a head cover having a bearing support, and operating means for the turbine comprising a plate-metal operating ring having a cylindrical vertical portion and a horizontal portion formed as a continuation of said vertical portion, plate metal ribs connecting said vertical and horizontal portions, and a bearing support having a circular bearing surface engageable with the outer lower surface of said cylindrical portion.

17. The combination in a hydraulic turbine comprising a composite speed ring construction having radially spaced channel irons curved in circular form, plate-metal webs disposed between and welded to said channel irons for supporting the same in rigid relation, supporting plates mounted on the inner side of said channel irons, and stay vanes mounted on said plates, the innermost one of said channels having ribs welded thereto and projecting inwardly toward the turbine axis for supporting a lower distributor plate.

18. The combination in a hydraulic turbine comprising a composite speed ring construction including upper radially spaced channel irons curved in circular form and having webs therebetween and welded thereto for supporting the same, plates welded to the innersides of said channels, stay vanes welded to said plates, and a head cover having a distributing ring provided with means for being supported by the inner one of said channel irons.

19. The combination in a hydraulic turbine comprising a composite speed ring construction including upper channel irons curved in circular form and having webs therebetween and welded thereto for supporting the same, plates welded to the underside of said channels, plate metal stay vanes welded to said plates, a head cover having a distributing ring provided with means for being supported by the inner one of said channel irons, and a lower set of channel irons constructed similar to said upper ones and also having plates to which said stay vanes are welded.

20. A composite structure for a hydraulic turbine comprising a speed ring of fabricated structural members welded together and including stay vanes, and a head cover removably supported by the upper portion of said speed ring and including a plate metal crown having substantially throughout its major extent a substantially straight generating line lying in a meridian plane, the lower portion of said speed ring having provision for removably supporting a lower distributor plate.

21. A composite head cover for hydraulic turbines comprising a distributing ring and a plate metal crown operatively supported thereby and having a depending conical wall, said conical wall comprising plate metal the surface of which is formed with straight line elements.

22. A composite head cover for a hydraulic turbine comprising a distributing ring and a plate metal crown having a depending conical wall, said conical wall comprising plate metal formed by a substantially straight line generating element the axis of generation coinciding with the turbine axis whereby said conical wall is substantially straight in any meridian section.

23. A composite head cover for a hydraulic machine comprising a plate metal crown having a substantially horizontal portion and a section depending therefrom, said section being substantially circular in cross-section and having its surface formed with straight line elements extending in a substantially axial direction.

24. A composite head cover for a hydraulic machine comprising a plate metal crown having a substantially horizontal portion and a section depending therefrom, said section being substantially circular in cross-section and having its surface formed with straight line elements extending in a substantially axial direction, said horizontal portion having a circular opening therein through which said depending section extends, and said section having a portion above the plane of said circular opening of greater diameter than that of said opening.

25. A composite head cover for a hydraulic turbine comprising a plate metal crown having a substantially horizontal portion and a cone section depending therefrom, said section being substantially circular in cross section and having its surface formed with straight line elements extending in a substantially axial direction, and plate metal ribs disposed in the lower portion of said depending section and extending inwardly toward the central axis of the head cover, said ribs being joined to the walls of said depending portion along substantially straight lines whereby said ribs are formed with straight edges, and bearing supporting means carried by said ribs.

26. A composite head cover for a hydraulic turbine comprising a plate metal crown having a substantially horizontal portion and a cone section depending therefrom, said section being substantially circular in cross section and having its surface formed with straight line elements extending in a substantially axial direction, plate metal ribs disposed in the lower portion of said depending section and extending inwardly toward the central axis of the head cover, said ribs being joined to the walls of said depending portion along substantially straight lines whereby said ribs are formed with straight edges, bearing supporting means carried by said ribs, an operating ring supporting bearing carried by the upper part of said cone section and plate metal ribs for supporting said bearing and being welded thereto and to the head cover structure.

27. A composite head cover for a hydraulic turbine comprising a plate metal crown having a substantially horizontal portion and a cone section depending therefrom, said section being substantially circular in cross section and having its surface formed with straight line elements extending in a substantially axial direction, plate metal ribs disposed in the lower portion of said depending section and extending inwardly toward the central axis of the head cover, said ribs being joined to the walls of said depending portion along substantially straight lines whereby said ribs are formed with straight edges, bearing supporting means carried by said ribs, an operating ring supporting bearing carried by the upper part of said cone section and plate metal ribs for supporting said bearing and being welded thereto and to the head cover structure along lines which are substantially straight.

28. A composite head cover for a hydraulic turbine comprising a plate metal crown having a substantially horizontal portion and a cone section depending therefrom, said section being substantially circular in cross section and having its surface formed with straight line elements extending in a substantially axial direction, plate metal ribs disposed in the lower portion of said depending section and extending inwardly toward the central axis of the head cover, said ribs being joined to the walls of said depending portion along substantially straight lines whereby said ribs are formed with straight edges, bearing supporting means carried by said ribs, an operating ring supporting bearing carried by the upper part of said cone section, and plate metal ribs for supporting said bearing and being welded thereto and to the head cover structure along lines which are substantially straight, the lines along which said ribs are welded all lying in substantially meridian planes.

29. A composite head cover for a hydraulic turbine comprising a flat annular plate member having a central opening therein, a distributing ring associated with the outer portion of said annular member, and a depending cone section extending through said central opening and having a portion above the plane of said opening of greater diameter than that of said opening whereby said cone is directly supported by said annular member and is welded thereto.

30. A composite head cover for a hydraulic turbine comprising a flat annular plate member having a central opening therein, a distributing ring associated with the outer portion of said annular member, and a depending cone section extending through said central opening and having a portion above the plane of said opening of greater diameter than that of said opening whereby said cone is directly supported by said annular member and is welded thereto, said depending section having at least the major portion of its length formed along straight line elements which lie in meridian planes.

31. A composite head cover for a hydraulic turbine comprising a flat annular plate member having a central opening therein, a distributing ring associated with the outer portion of said annular member, and a depending section of substantially circular cross section extending through said central opening and resting upon said annular member and being welded thereto, whereby any load on said depending section in an axial direction thereof is primarily carried substantially by said annular plate member while the welded joint between said depending section and said annular member comprises a secondary support.

32. A composite head cover for a hydraulic turbine comprising a flat annular plate member having a central opening, a distributing ring associated with the outer portion of said annular member, a cone section extending through said central opening and having a portion above the plane thereof of larger diameter than that of said opening whereby said cone is adapted to be supported on said annular member, said cone section and annular member having a welded joint therebetween in addition to said supporting relation and said cone section comprising a sheet metal plate bent around as a surface of revolution, the axis of which coincides with the turbine axis and the surface of said cone section being formed substantially through its length along straight line elements lying in meridian planes, a runner shaft bearing support disposed in the lower portion of said cone section, said bearing being supported by plate metal ribs disposed in juxtaposition to the inner surface of said cone section along substantially straight lines, and said ribs and cone section having a welded joint therebetween along said straight lines, an operating ring bearing carried by the upper portion of said cone section, and plate metal ribs having substantially straight line contact with said ring bearing and said cone section and along which lines these elements are secured to each other by a welded joint.

33. A composite head cover for a hydraulic turbine comprising a flat annular plate member having a central opening, a distributing ring associated with the outer portion of said annular member, a cone section extending through said central opening and supported on said annular member, said cone section and annular member having a welded joint therebetween and said cone section comprising a sheet metal plate bent around as a surface of revolution the axis of which coincides with the turbine axis and the surface of said cone section being formed substantially throughout its length along straight line elements lying in meridian planes, a runner shaft bearing supported by plate metal ribs disposed in juxtaposition to the inner surface of said cone section along substantially straight lines and said ribs and cone section having a welded joint therebetween along said straight lines, an operating ring bearing carried by the upper portion of said cone section, and plate metal ribs connecting said distributing ring with said annular plate member and said ring bearing with said cone section, the line of jointure of the ribs with said ring bearing, cone section and plate member being on substantially straight lines along which a welded joint is provided.

34. A composite head cover for a hydraulic turbine comprising an upper cast distributing ring having bearings therein for journaling the shafts of adjustable guide vanes, and a crown supported by said cast distributing ring and comprising plate metal members forming a horizontal portion extending inwardly from said distributor ring and a conical plate metal section depending from said horizontal portion.

35. A composite head cover for a hydraulic turbine comprising an upper cast distributing ring having bearings therein for journaling the shafts of adjustable guide vanes, a crown supported by said cast distributing ring, said crown having a plate metal member forming a horizontal portion extending inwardly from said distributing ring and a plate metal conical section depending from said horizontal portion, said plate members being formed substantially throughout along straight line elements, and plate metal supporting ribs and members associated with said crown plates and being joined thereto along substantially straight lines along which lines welded joints are provided, and substantially all of said straight line elements, lines of jointure and ribs being disposed in the meridian planes.

ROBERT E. B. SHARP.